US007273030B2

(12) United States Patent
Yoshihara et al.

(10) Patent No.: US 7,273,030 B2
(45) Date of Patent: Sep. 25, 2007

(54) CRANKSHAFT SUPPORT STRUCTURE OF INTERNAL COMBUSTION ENGINE

(75) Inventors: Akira Yoshihara, Kyoto (JP); Tsuyoshi Nishida, Okazaki (JP); Satoshi Higashide, Kariya (JP); Shuhei Ishiyama, Nagoya (JP); Kinichi Furukawa, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/259,113

(22) Filed: Oct. 27, 2005

(65) Prior Publication Data

US 2006/0090724 A1 May 4, 2006

(30) Foreign Application Priority Data

Oct. 28, 2004 (JP) ............................ 2004-314471

(51) Int. Cl.
*F02B 75/22* (2006.01)

(52) U.S. Cl. ............................. 123/195 R; 123/195 H

(58) Field of Classification Search ............ 123/195 R, 123/195 H

See application file for complete search history.

(56) References Cited

U.S. PATENT DOCUMENTS 2,019,657 A * 11/1935 Church .................. 123/195 R
3,117,498 A * 1/1964 Johnson et al. ............... 92/149
4,237,847 A * 12/1980 Baugh et al. ........... 123/195 R
5,016,584 A * 5/1991 Inoue et al. ............ 123/195 R
6,216,658 B1 * 4/2001 Pierro et al. ............. 123/193.2

FOREIGN PATENT DOCUMENTS

JP 8-277747 A 10/1996

* cited by examiner

*Primary Examiner*—Noah P. Kamen
(74) *Attorney, Agent, or Firm*—Birch, Stewart, Kolasch & Birch, LLP

(57) ABSTRACT

A crankshaft support structure of an internal combustion engine, comprising a crankshaft having journal portions a saddle-shaped bearing caps respectively mounted on an undersurfaces of the journal support bases formed in a lower portion of the cylinder block in such a manner as to straddle the journal portions being accommodated in the bearing portions, whereby the journal portions are rotatably supported wherein, of the undersurface of each of the journal support bases, an undersurface portion overlapping with an edge portion of each of end faces on both sides of each of the bearing caps is formed to be a thick portion thicker than other portions, and a mount surface to be positioned on the undersurface overlapping with the thick portion of each of the bearing caps is formed along the thick portion.

9 Claims, 3 Drawing Sheets

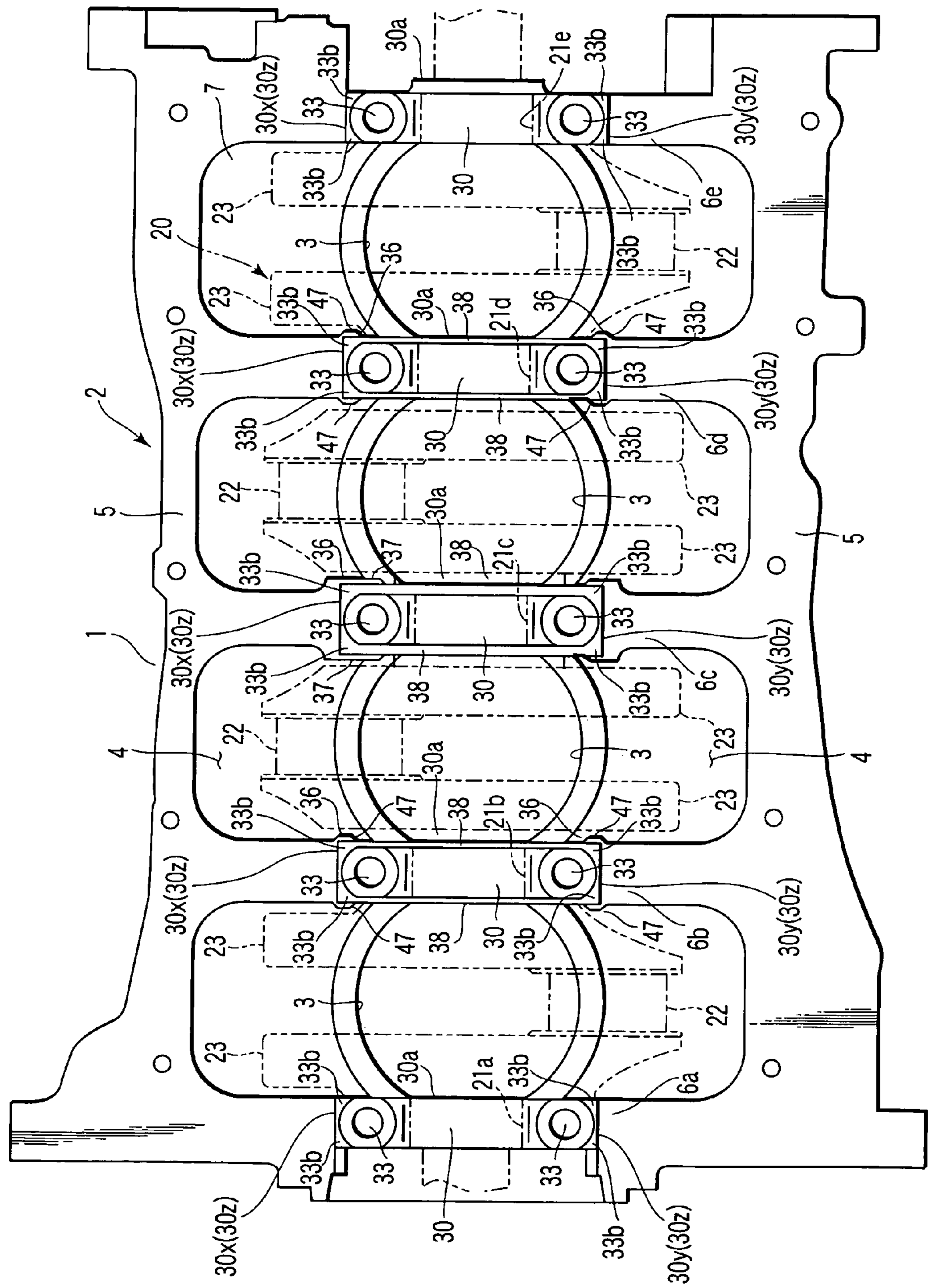
F I G. 1

CRANKSHAFT SUPPORT STRUCTURE OF INTERNAL COMBUSTION ENGINE

CROSS-REFERENCE TO RELATED APPLICATIONS

This application is based upon and claims the benefit of priority from prior Japanese Patent Application No. 2004-314471, filed Oct. 28, 2004, the entire contents of which are incorporated herein by reference.

BACKGROUND OF THE INVENTION

1. Field of the Invention

The present invention relates to a crankshaft support structure of an internal combustion engine for rotatably supporting journal portions of the crankshaft in a lower portion of a cylinder block.

2. Description of the Related Art

Many types of reciprocating engines use a structure wherein a crankshaft is rotatably assembled with a lower portion of a cylinder block having cylinder bores, and motions of respective pistons reciprocating inside the cylinder bores are converted into rotational motions.

Conventionally, in an assembly structure for a crankshaft of an engine of the type described above, for example, a saddle-shaped bearing cap is assembled to an undersurface of a wall-shaped journal support base formed between a pair of skirt portions extending down from both sides of the cylinder bore, whereby journal portions of the crankshaft are rotatably supported.

Generally, journal support bases are each formed into the shape as a wall that extends along the direction crossing with a direction of an axis ("axial direction," hereinafter) of the crankshaft. On an undersurface of the journal support base, there are formed semicircular bearing portions wherein half parts of the respective journal portions of the crankshaft are accommodated. With bearing caps being mounted on the undersurfaces of the respective journal support bases, the journal portions of the crankshaft are rotatably supported.

Ordinarily, a reciprocating engine is designed in accordance with a variety of limit designs. As such, when the engine is continually operated at a high rotational speed zone with for example, near-maximum outputs or higher, an undesirable case can take place where a crack can occur in a journal support base. Such a case is considered to occur with application of an excessively high load, excitation force, and/or the like developed with the high rotational speed operation on the journal support base.

Generally, configurations have been proposed to provide reinforcement on the journal support base in such an event as described above. For example, in a configuration disclosed in Jpn. Pat. Appln. KOKAI Publication No. 08-277747, reinforcement is provided in such a manner as to increase dimensions such as the width dimensions of the entirety of the bearing surface forming the bearing portion and the entirety of the journal support portion having the bearing portion.

However, compactness is required for engines. As such, it is desired to prevent engines from being increased in size. However, according to such the reinforcement, the journal portion of the crankshaft is compelled to be configured with an increased width to meet the increased width dimension of the bearing portion. This results in an increase in the total length of the crankshaft, hence leading to an increase in the size of the cylinder block. Consequently, the engine has to be enlarged. Even supposing that the configuration is formed by reducing the width dimension of a pin portion of the crankshaft in consideration of the increased width dimension of the bearing portion in order to prevent the increase in the total length of the crankshaft. In this case, however, another problem takes place in that the strength of a connecting rod mated with the pin portion reduced to be insufficient.

SUMMARY OF THE INVENTION

An aspect of the invention is;

a crankshaft support structure of an internal combustion engine, comprising:

a cylinder block;

a crankshaft having journal portions assembled to a lower portion of the cylinder block;

wall-shaped journal support bases formed in the lower portion of the cylinder block and extending along a direction crossing with an axis of the crankshaft;

semi-circular bearing portions respectively formed to undersurfaces of the journal support bases, the bearing portions accommodating half parts of each of the journal portions; and saddle-shaped bearing caps respectively mounted on the undersurfaces of the journal support bases in such a manner as to straddle the journal portions being accommodated in the bearing portions, whereby the journal portions are rotatably supported;

wherein, of the undersurface of each of the journal support bases, an undersurface portion overlapping with an edge portion of each of end faces on both sides of each of the bearing caps is formed to be a thick portion thicker than other portions, and a mount surface to be positioned on the undersurface overlapping with the thick portion of each of the bearing caps is formed along the thick portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 1 is a bottom view of a cylinder block, which view shows a crankshaft support structure according to one embodiment of the present invention;

DETAILED DESCRIPTION OF THE INVENTION

One embodiment of the present invention will be described with reference to FIGS. 1 to 5.

Figure 2:
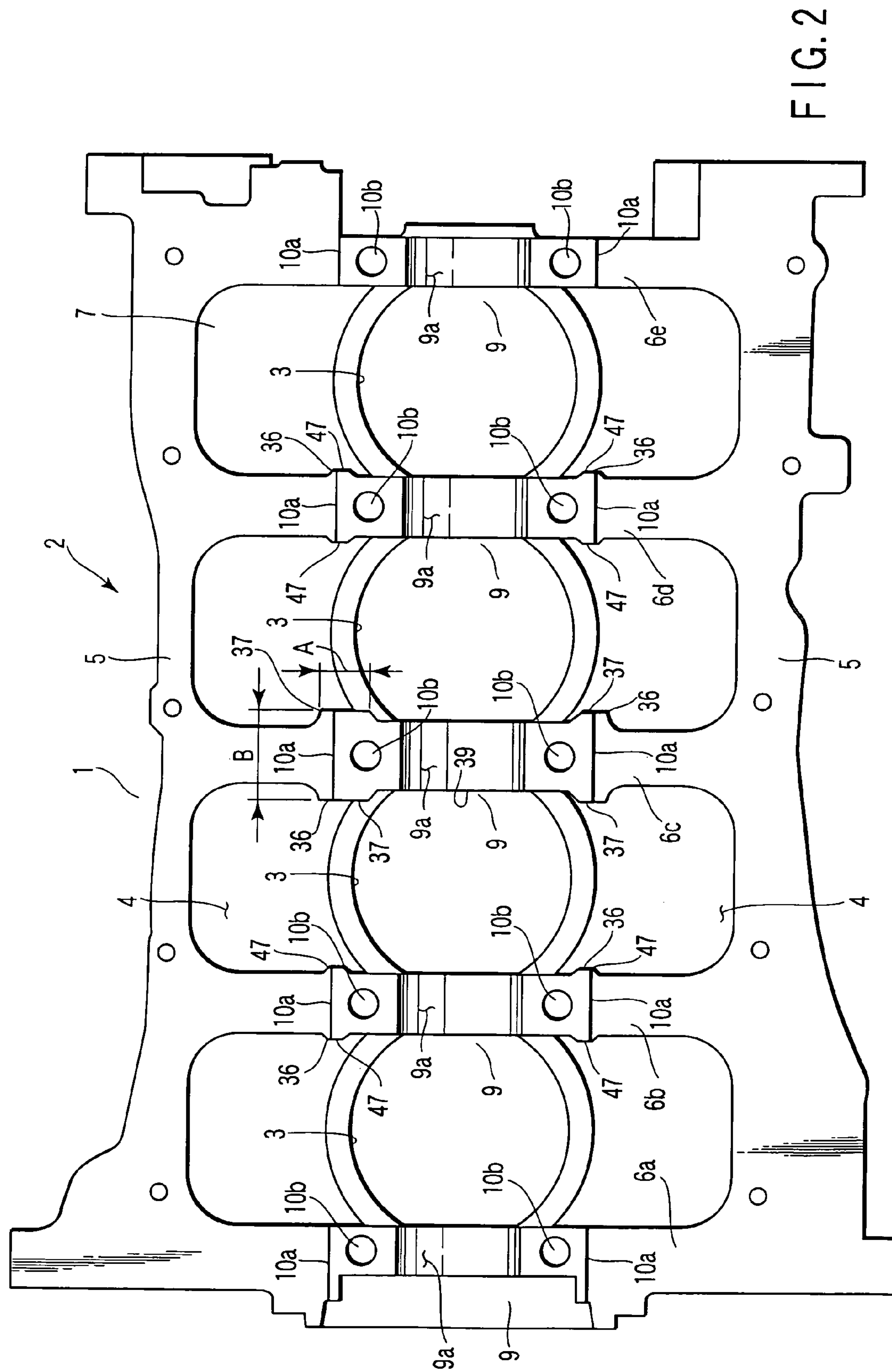
FIG. 2 is a bottom view of the cylinder block wherein bearing caps are removed from journal support bases.
Figure 3:
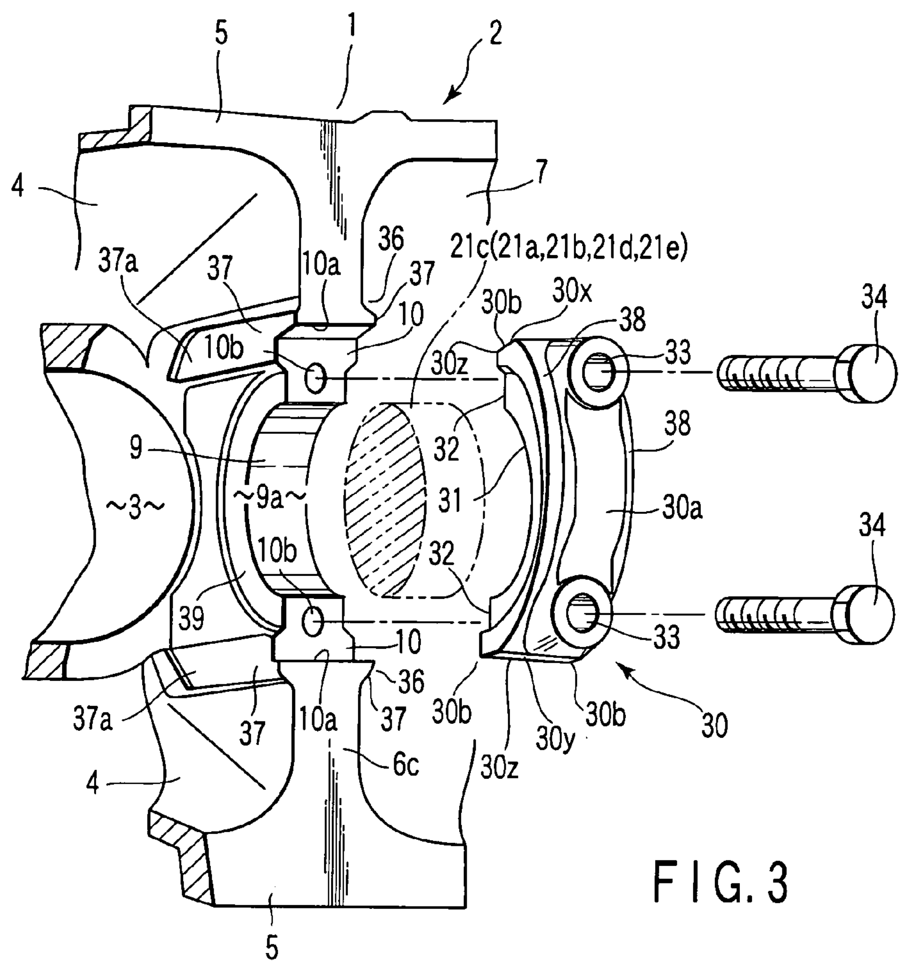
FIG. 3 is an exploded perspective view showing a portion wherein a bearing cap is removed from a journal support base disposed in the center of the cylinder block.
Figure 4:
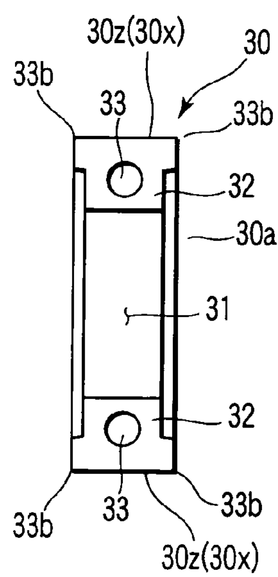
FIG. 4 is a bottom view of the bearing cap to be assembled to the journal support base in the center.
Figure 5:
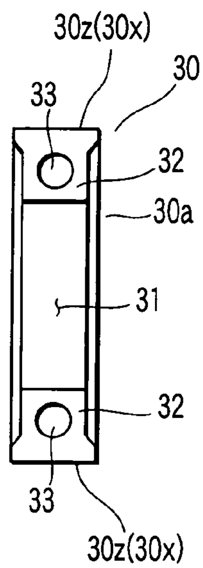
FIG. 5 is a bottom view of a bearing cap assembled with a journal support base disposed adjacent the journal support base in the center.

FIG. 1 is a bottom view taken from the lower side of a cylinder block of an engine, such as reciprocating four-cylinder engine. FIG. 2 is a bottom view of the cylinder block wherein bearing caps are removed from journal support bases. FIG. 3 is a perspective view of a portion of the FIG. 2. FIGS. 4 and 5 are each a bottom view taken of a mount portion of the bearing cap.

Referring to FIGS. 1 to 3, numeral 1 denotes a main body portion of a cylinder block 2 of a material such as an aluminum alloy. Numeral 20 denotes a crankshaft that is assembled to the lower portion of the main body portion 1 shown by double-dotted lines in FIG. 1. Numeral 30 denotes a respective bearing cap that rotatably supports the crankshaft 20.

As shown in FIG. 1, the crankshaft 20 includes five journal portions 21*a* to 21*e* (each corresponding to a journal portion of the present invention) arranged in series. A pair of balance weights 23 is integrally formed between adjacent ones of the journal portions 21*a* to 21*e*. A crank pin portion 22 is interposed as a crack portion between the respective pair of balance weights 23.

As shown in FIGS. 1 to 3, four cylinder bores 3 are arranged in series with predetermined spaces in a head portion (inner portion in the paper thickness direction of FIGS. 1, 2) of the main body portion 1 of the cylinder block 2. In addition, as partly shown in FIG. 3, a pair of skirt portions 4 (and 4) is formed in a bottom portion of the main body 1 (outer portion in the paper thickness direction of FIGS. 1, 2). The skirt portions 4 extend down from both sides of a train of the cylinder bores ("cylinder bore train," hereafter). A water jacket (not shown) is formed around the cylinder bore 3 in such a manner as to surround the cylinder bore 3. A flange-shaped mount seat 5 is formed in a lower end portion, which is coincident with the end of the respective skirt portion 4.

Journal support bases 6*a* to 6*e*, respectively, are integrally formed between the skirt portions 4 (in the pair) in a frontmost portion of the cylinder bore train, inbetween mutually adjacent cylinder bore pairs, and a rearmost portion of the cylinder bore train. The journal support bases 6*a* to 6*e* are each formed similarly into the shape as a wall. The journal support bases 6*a* to 6*e* each extend along the direction crossing with the axial direction of the crankshaft 10 over the range between the skirt portions 4. Of the journal support bases 6*a* to 6*e*, the journal support bases 6*a* and 6*e* disposed in the frontmost and rearmost portions respectively extend from the head portion of the main body portion 1 to the mount seat 5 thereof. Thereby, front and rear panels of the cylinder block 2 are formed. A crankcase 7 is formed in the lower portion of the cylinder block 2 in such a manner as to be surrounded by the journal support bases 6*a* to 6*e* and the skirt portions 4. The other journal support bases 6*b* to 6*d* each extend from the lower end portion of the cylinder bore 3 to the mount seat 5, as shown in FIG. 3.

As shown in FIG. 3, a semicircular bearing portion 9 is formed in the center of an undersurface of each of the journal support bases 6*a* to 6*e*, which are arranged along the cylinder bore train, or in the vicinity of the center. In FIG. 3, numeral 9*a* denotes a circularly arcuate bearing surface of the bearing portion 9. Crank journal portions 21*a* to 21*e* are accommodated in the respective bearing portions 9. In addition, the crank pin portions 22 are each disposed in a lower portion of the cylinder bore 3.

Of the journal support bases 6*a* to 6*e*, in an undersurface portion over which is at the both ends of bearing portion and the respective bearing cap 30 is mounted, a recessed portion 10 recessed from a different undersurface portion is formed, as shown in FIG. 3.

As shown in FIG. 3, a main body portion 30*a* of the respective bearing cap 30 is shaped as a saddle. A semicircular bearing surface 31 is formed in a recessed portion of the main body portion 30*a*. A pair of mount surfaces 32 are respectively formed on two (both) sides of the bearing surface 31. In FIG. 3, numeral 33 denotes bolt holes extending therethrough from the mount surface 32 to a side portion on the opposite side.

As shown in FIG. 3, the respective bearing caps 30, for example, are fitted to the journal support bases 6*a* to 6*e*, whereby the respective bearing caps 30 are assembled to undersurfaces of the journal support bases 6*a* to 6*e*. In this case, the respective bearing caps 30 are mounted in such a manner as to straddle the crank journal portions 21*a* to 21*e* which are accommodated in respective bearing journals 9.

More specifically, as shown in FIG. 3, for example, the respective bearing cap 30 is fitted to the recessed portion 10 thereby to bring the mount surface 32 of the respective bearing cap 30 to overlap the recessed undersurface portion. Thereafter, a fastener, such as a bolt member 34, is screw-inserted from the bolt hole 33 into a screw hole 10*b* that is formed in a recessed undersurface portion. Thereby, the entirety of the respective bearing cap 30 is mounted on the undersurface of each of the journal support bases 6*a* to 6*e*. Consequently, the crank journal portions 21*a* to 21*e*, respectively, are rotatably supported by the journal support bases 6*a* to 6*e* and the bearing caps 30.

Then, although not shown, the respective crank pin portion 22 of the crankshaft 20 is rotatably supported to a connecting rod (not shown) extending from a piston (not shown) reciprocatingly in the respective cylinder bore 3. Thereby, the reciprocating linear motion of the respective piston is converted into the rotational motion.

In the four-cylinder crankshaft support structure thus formed, the journal support base 6*c*, which is the third journal support base, supports the crank journal portion 21*c* disposed in the center of the axial direction. The journal support base 6*c* is provided with reinforcement described below since the journal support base 6*c* tends to receive most excessive loads, excitation forces, and the like with inertia forces during high rotational speed operation.

As shown in FIGS. 2 and 3, in the journal support base 6*c*, a reinforcement structure is provided in the manner that thick portions 36 thicker in thickness dimension than other undersurface portions are each formed in respective undersurface portions overlapping with front and rear ends of the respective bearing cap 30. The thick portions 36 are respectively positioned in undersurface portions overlapping with respective edge portions 30*z* of frontmost and rearmost end faces 30*x* and 30*y* with the bearing surface 31, bearing portion 9, and crank journal portion 21*c* being sandwiched therebetween. In addition, the respective thick portions 36 are positioned in peripheral undersurface portions inclusive of boundary portions 10*a* of the recessed portions 10.

The thick portion 36 is formed of a rib 37 extending along sidewalls of the journal support base 6*c*. For example, as shown in FIGS. 2 and 3, of both edges in the width direction on the undersurface of the journal support base 6*c*, the ribs 37 are each provided in a region having a predetermined length A from an inner side to outer side of the respective bearing cap 30. The bearing cap 30 straddles the boundary portion 10*a* with respect to the boundary portion 10*a* as a reference. In addition, the rib 37 is positioned outwardly from the center of the screw hole 10*b*.

The respective thick portion 36 thus formed of the rib 37 serves to increase the stiffness strengths of an undersurface portion that overlaps with a rectangular portion 30*b* at the end of the bearing cap 30 (or, "bearing cap end," hereinafter) and peripheral portions thereof, wherein stresses are concentrated, particularly, during high rotation speed operation of the engine. In FIG. 2, the letter B denotes the thickness dimension of the thick portion 36.

The respective rib 37 has, for example, a rectangular cross section, and linearly extends to a portion in the vicinity of the lower end of the cylinder bore 3, as shown in FIG. 3. Thereby, high stiffness strength is imparted to the journal support base 6*c*. The rib 37 is partly cut out for prevention from interference with the balance weight 23. The cutout portion is shown by numeral 37*a*.

As shown in FIGS. 3 and 4, the mount surface 32 of each of both ends of the bearing cap 30 is shaped correspondingly to the thick portion 36. As such, similarly as the thick portion 36, the width dimension of the respective end portion in the front-rearward direction of the mount surface 32 is formed to be relatively thick. More specifically, the mount surface 32 is formed into a shape of the letter T, wherein an outer side is wider than an inner side. In addition, the entirety of the outer peripheral edge portion of the main body portion 30*a* also is formed to be thick correspondingly to the thick mount surface 32. In the drawing figure, numeral 38 denotes an outer periphery edge portion of the thickened main body portion 30*a*.

In addition, ribs 47 are formed to two edges of the undersurfaces of the respective journal support bases 6*b* and 6*d*, which are adjacent the journal support base 6*c* and coincide with the second and fourth journal support bases of the four-cylinder engine, as shown in FIG. 2. The ribs 47 are formed in sites similar to those of the ribs 37 of the journal support base 6*c*. The respective thick portion 36 is configured of the rib 47. The rib 47 is formed smaller in its outer profile than the rib 37 having the length A and the width B. The ribs 47 enable increasing the stiffness against, for example, loads and excitation forces being transferred to the cylinder block 2 in an explosion process of the general engine. Thus, the structure is formed such that the ribs are arranged to be sequentially smaller in their outer profile in the directions to the both ends from the journal support base 6*c* located in the center of the cylinder block 2. Accordingly, the stiffness strength of the cylinder block 2 is reinforced with good balance. Further, as shown in FIG. 5, similarly as described above, the bearing caps 30 to be assembled with the journal support bases 6*b* and 6*d* are each configured to have a thick mount surface 32, and outer peripheral edge portions 38 are thickened.

In FIG. 3, numeral 39 denotes a recessed portion for a thrust bearing formed in a sidewall portion around the bearing surface 9*a* of the third journal support base 6*c*.

Thus, the thick portions 36 are formed only in the undersurface portions on which the rectangular portions 30*b* at the front and rear ends of the bearing cap 30 are mounted, so that the journal support base 6*c* can be reinforced without influencing the bearing portion 9. More specifically, although the width dimensions of, for example, the bearing portion 9 and bearing surface 9*a* of the journal support base 6*c* are not increased, sufficient reinforcement can be provided against concentration of, for example, loads and stresses exerted from the rectangular portions 30*b* of the bearing cap ends. Accordingly, although the total length of the crankshaft 20 is not increased, the strength of the journal support base 6*c* can be increased. Consequently, stabilized operation of the engine in a high engine speed zone can be expected to be implemented. Further, the portions to be thickened are formed only in local portions, so that increase in the weight of the cylinder block 2 is small. Particularly, since the thick portions 36 are formed in the undersurface portions of the journal support base 6*c*, rational reinforcement can be provided only on portions whereon great stress burdens are imposed during operation of the engine in a high engine speed zone. Consequently, reinforcement suitable to restrain crack occurrence during operation of the engine in a high engine speed zone can be provided.

Further, since the configuration is formed in the manner that the respective journal support bases 6*b* to 6*d*, except those located at both ends, are smaller in their outer profiles in the directions from the center to both ends. Accordingly, the cylinder block 2 can be reinforced with good balance.

In addition, in the configuration, the respective thick portion 36 is configured of the rib 37 formed in the undersurface edge portions of the journal support base 6*c*. As such, it becomes easy for the configuration to provide appropriate functions against loads being exerted from the rectangular portion 30*b* of the bearing cap end. Consequently, the journal support base 6*c* can be reinforced with the simple structure. Especially, since the rib 37 continually extends in the linear manner to the vicinity of the lower end portion of the cylinder bore 3, the characteristics of the rib 37 can be effectively used. Thereby, sufficient reinforcement can be expected to be provided.

Further, in the configuration of the respective bearing cap 30, the mount surface 32 is formed to be thick correspondingly to the journal support base 6*c* added or reinforced with the rib 37. This configuration enables reducing surface pressure to be exerted from the bearing cap ends on, for example, the thick portion 36 and rib 37 of the journal support base 6*c*. Consequently, the burden on the thick portion 36 of the journal support base 6*c* is reduced, so that the reinforcement by the thick portion 36 can be assisted. Particularly, the entirety of the outer peripheral edge portion of the bearing cap 30 is formed to be thick correspondingly to the thick portion of the mount surface 32, so that stabilized strength can be secured with the bearing cap 30.

The present invention is not limited to the one embodiment described above, but may be practiced by altering and modifying in various ways without departing from the scope and spirit of the invention. For example, according to the configuration of the one embodiment, the thick portions are formed to the journal support base in the center in the axial direction of the cylinder block and the journal support bases on two sides thereof, but there are no limitations thereto. The configuration may be such that the thick portion be provided only to one journal support base that supports the journal support base in the center in the axial direction of the crankshaft. In addition, while the one embodiment has been described with reference to the example using the insertion-type bearing cap, a bearing cap of an other type to be set by being mounted on the undersurface of the journal support base may be used. Further, according to the one embodiment, while the cylinder block of the four-cylinder engine is used, there are no limitations thereto. The present invention may be adapted to cylinder blocks of other multi-cylinder engines. Of course, the present invention may be adapted to other reciprocating engines apart from gasoline engines.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crankshaft support structure of an internal combustion engine, comprising:

a cylinder block;

a crankshaft having journal portions assembled to a lower portion of the cylinder block;

wall-shaped journal support bases formed in the lower portion of the cylinder block and extending along a direction crossing with an axis of the crankshaft;

semi-circular bearing portions respectively formed to undersurfaces of the journal support bases, the bearing portions accommodating half parts of each of the journal portions; and saddle-shaped bearing caps respectively mounted on the undersurfaces of the journal support bases in such a manner as to straddle the journal portions being accommodated in the bearing portions, whereby the journal portions are rotatably supported, wherein, each undersurface has a recessed portion that opposes a mount surface of the saddle-shaped bearing cap, and the undersurface, including the recessed portion, is provided with a thick portion thicker than other portion of the undersurface, the mount surface also has a thickness that corresponds to a thickness of the thick portion.

2. A crankshaft support structure of an internal combustion engine, according to claim 1, wherein the thick portion is formed to a journal support base which supports a journal portion disposed in a center of a direction of the axis of the crankshaft.

3. A crankshaft support structure of an internal combustion engine, comprising:

a cylinder block;

a crankshaft having journal portions assembled to a lower portion of the cylinder block;

wall-shaped journal support bases formed in the lower portion of the cylinder block and extending along a direction crossing with an axis of the crankshaft;

semi-circular bearing portions respectively formed to undersurfaces of the journal support bases, the bearing portions accommodating half parts of each of the journal portions; and saddle-shaped bearing caps respectively mounted on the undersurfaces of the journal support bases in such a manner as to straddle the journal portions being accommodated in the bearing portions, whereby the journal portions are rotatably supported, wherein, each undersurface has a portion that opposes a mount surface of a saddle-shaped bearing cap, and the undersurface, including said portion, is provided with a thick portion thicker than other portion of the undersurface, the mount surface also has a thickness that corresponds to a thickness of the thick portion, wherein the thick portion is formed in a manner that, a rib extending along sidewalls of each of the journal support bases is formed in a region of each of edges on both sides of each of the journal supports bases, wherein the region has a predetermined length from an inner side to outer side of each of the bearing caps with respect to a site set as reference, the site overlapping with the edge portion of each of the end faces on both sides of each of the bearing caps.

4. A crankshaft support structure of an internal combustion engine, according to claim 3, wherein the rib linearly extends to the vicinity of a cylinder bore formed in the cylinder block.

5. A crankshaft support structure of an internal combustion engine, comprising:

a cylinder block;

a crankshaft having journal portions assembled to a lower portion of the cylinder block;

wall-shaped journal support bases formed in the lower portion of the cylinder block and extending along a direction crossing with an axis of the crankshaft;

semi-circular bearing portions respectively formed to undersurfaces of the journal support bases, the bearing portions accommodating half parts of each of the journal portions; and saddle-shaped bearing caps respectively mounted on the undersurfaces of the journal support bases in such a manner as to straddle the journal portions being accommodated in the bearing portions, whereby the journal portions are rotatably supported, wherein, each undersurface has a portion that opposes a mount surface of a saddle-shaped bearing cap, and the undersurface, including said portion, is provided with a thick portion thicker than other portion of the undersurface, the mount surface also has a thickness that corresponds to a thickness of the thick portion, wherein the thick portion is formed to a journal support base which supports a journal portion disposed in a center of a direction of the axis of the crankshaft, and wherein the thick portion is formed in a manner that, a rib extending along sidewalls of each of the journal support base is formed in a region of each of edges on both sides of each of the journal supports bases, wherein the region has a predetermined length from an inner side to outer side of each of the bearing cap with respect to a site set as reference, the site overlapping with the edge portion of each of the end faces on both sides of each of the bearing caps.

6. A crankshaft support structure of an internal combustion engine, comprising:

a cylinder block having wall-shaped journal support bases formed in the lower portion of the cylinder block and extending along a direction crossing with an axis of a crankshaft; and semi-circular bearing portions respectively formed to undersurfaces of the journal support bases, the bearing portions accommodating half parts of each of a journal portions of the crankshaft; and wherein, each undersurface has a recessed portion that opposes a mount surface of a bearing cap, and the undersurface, including the recessed portion, is provided with a thick portion thicker than other portion of the undersurface.

7. A crankshaft support structure of an internal combustion engine, according to claim 1, wherein the mount surface also has a thickness that corresponds to a thickness of the thick portion.

8. A crankshaft support structure of an internal combustion engine, according to claim 1, wherein the recessed portion makes direct contact with the mount surface of the bearing cap.

9. A crankshaft support structure of an internal combustion engine, according to claim 6, wherein the recessed portion makes direct contact with the mount surface of the bearing cap.

* * * * *